Patented July 5, 1938

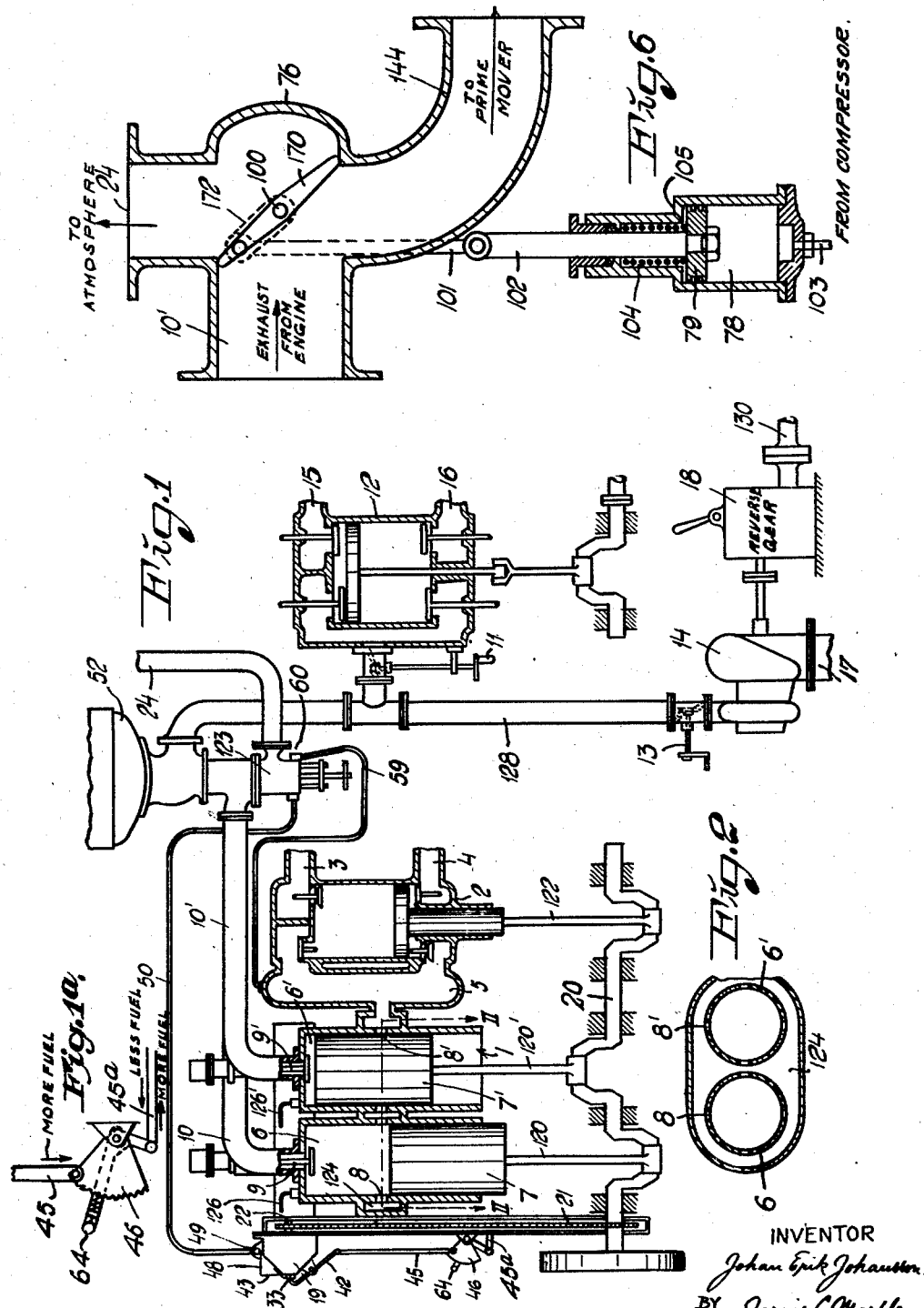

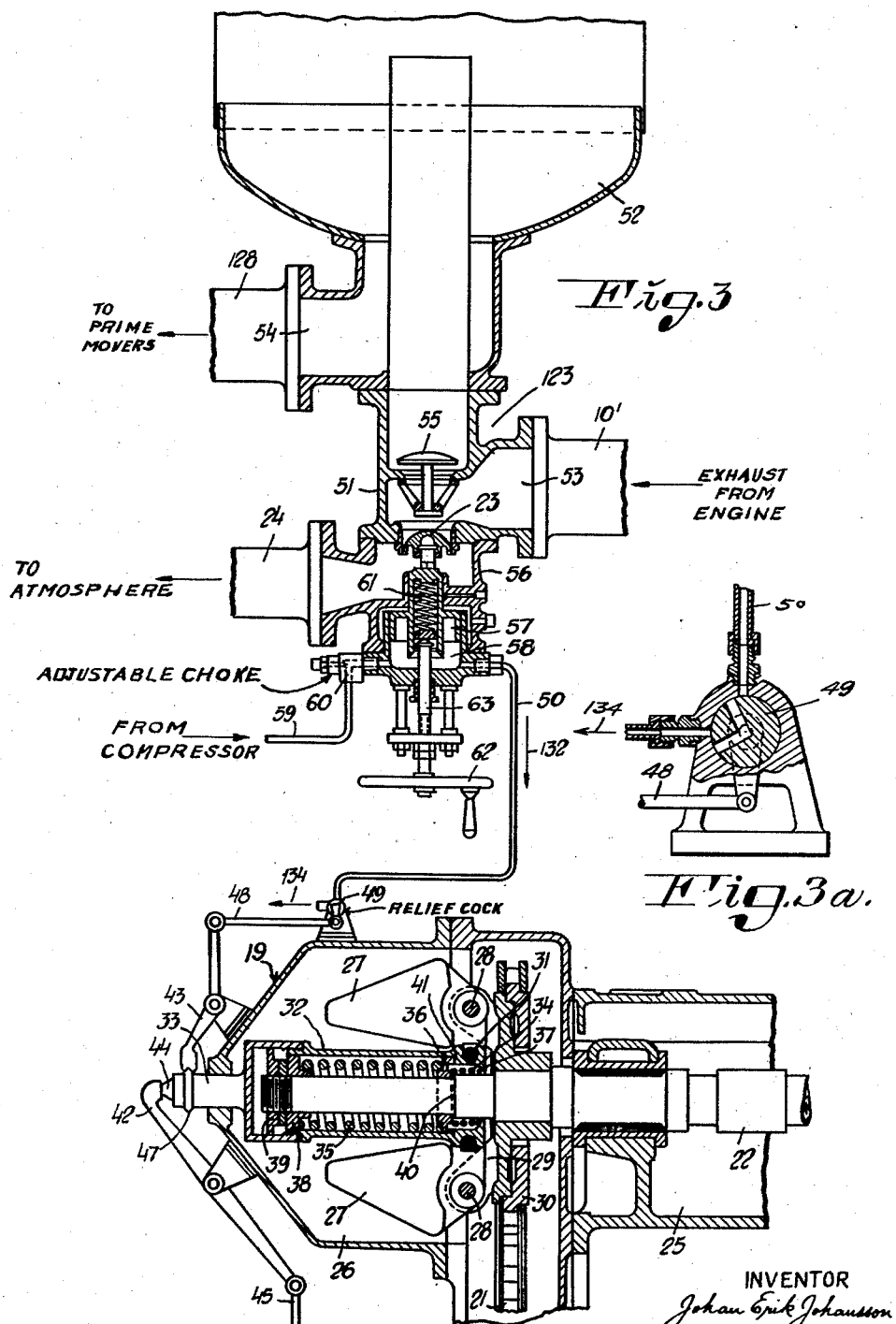

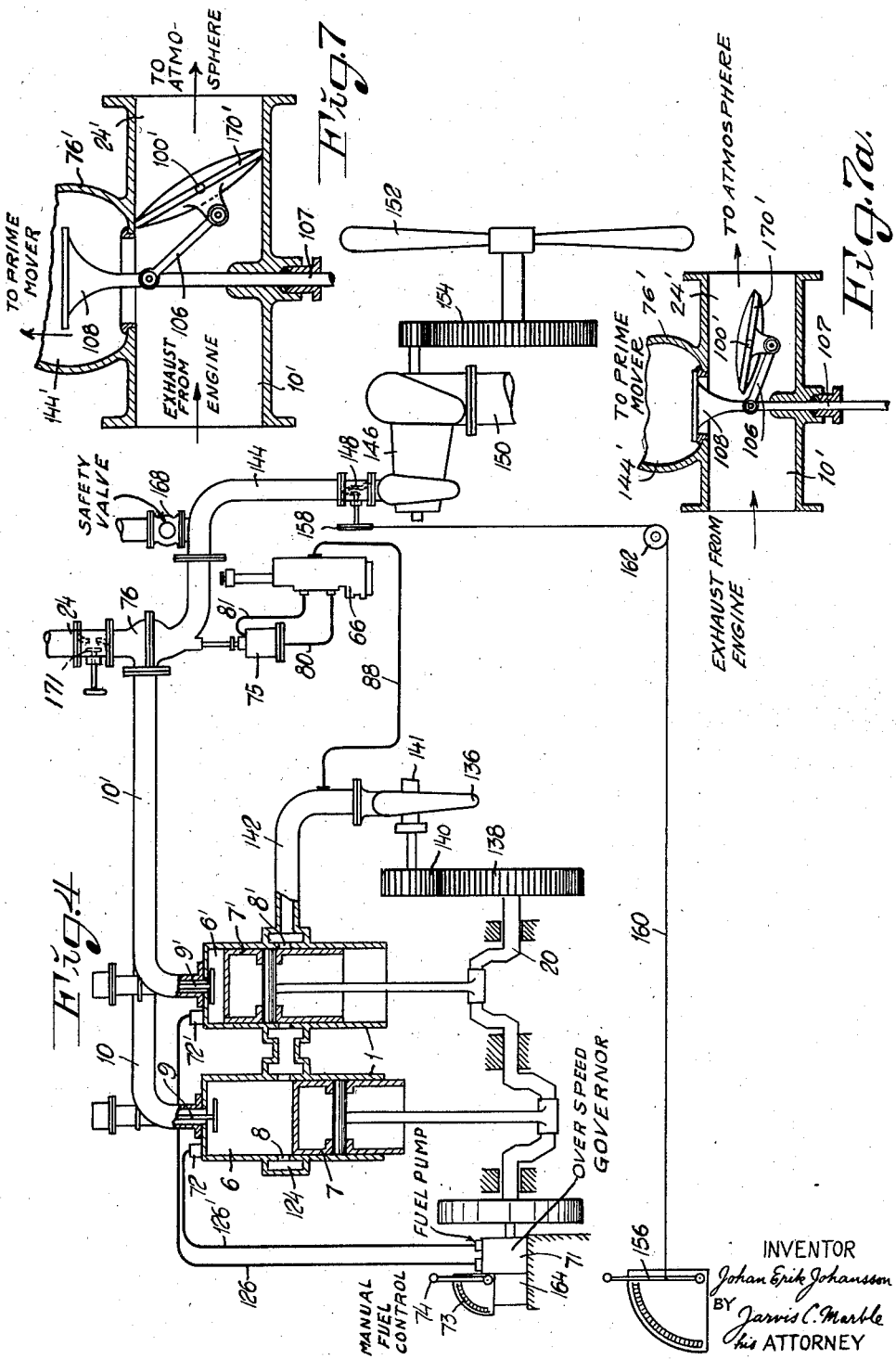

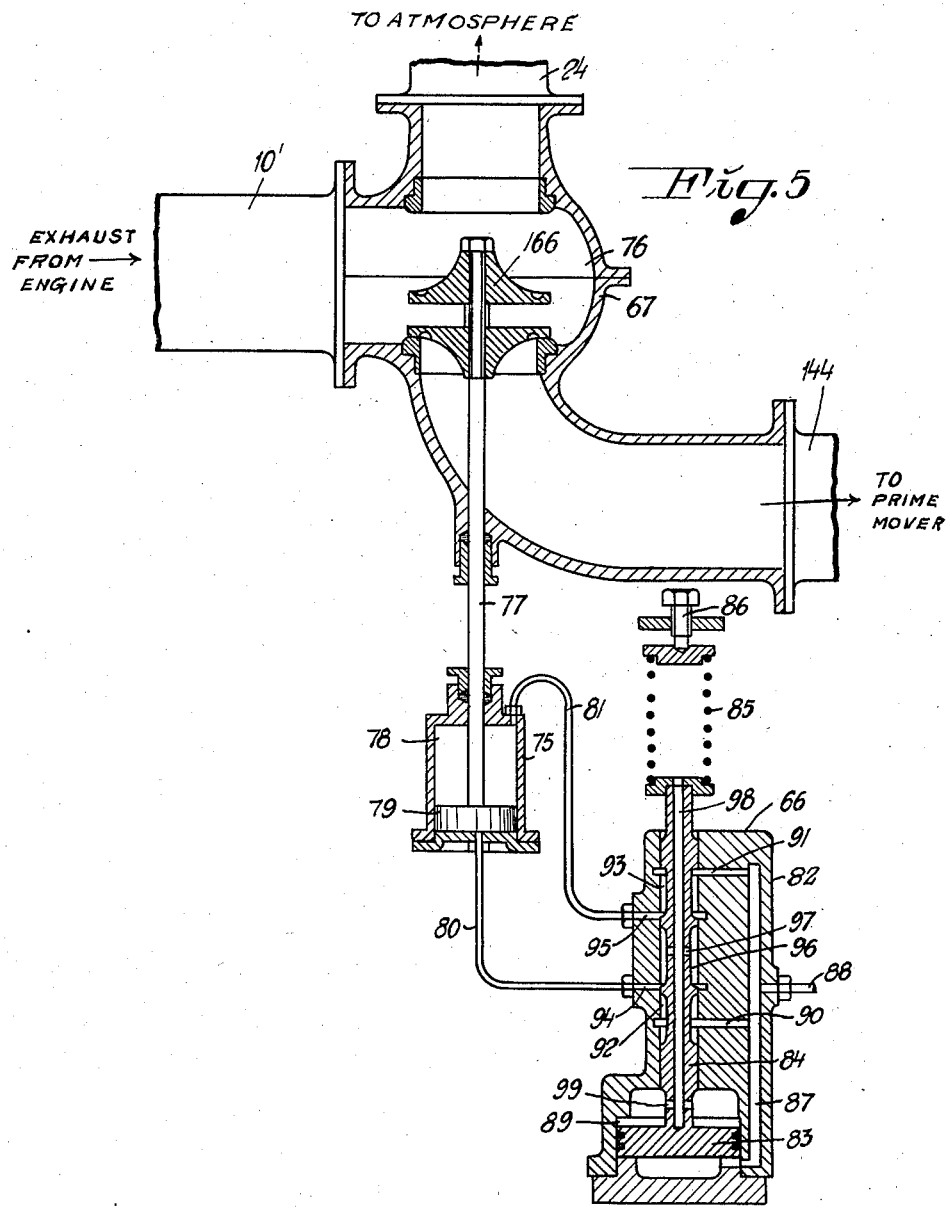

2,123,009

UNITED STATES PATENT OFFICE 2,123,009

INTERNAL COMBUSTION POWER PLANT

Johan Erik Johansson, Gothenburg, Sweden, assignor to Aktiebolaget Götaverken, Gothenburg, Sweden, a corporation of Sweden Application April 11, 1936, Serial No. 73,893
In Sweden December 15, 1933

16 Claims. (Cl. 60—44)

The present invention relates to internal combustion power plants of the type comprising a prime mover for expanding motive fluid to produce power and an internal combustion engine driving a compressor for supplying charging and scavenging air to the internal combustion engine at a pressure sufficiently high to cause a part of the air to be discharged with the combustion gases, in order to form a motive fluid to be supplied to the prime mover and consisting of exhaust gases at high back pressure and a substantial amount of excess air.

The general object of the invention is to provide means to prevent stopping of the internal combustion engine when the prime mover driven by the exhaust gases from the engine is idling or running on low load. For the purpose of obtaining the above object I provide an outlet valve in the connection between the internal combustion engine and the motor, said outlet valve being adapted to lead off driving medium from said connection in response to certain operating conditions of the power plant more specifically pointed out in the following description.

For a better understanding of the nature of the invention, together with further objects and advantageous details and combinations of parts, and the manner in which it is carried into effect, reference may be had to the accompanying drawings forming a part of this specification and the following description thereof.

In the drawings:

Fig. 1 shows partly in section a diagrammatic view of a power plant embodying the invention;

Fig. 1a shows on enlarged scale a part of the control apparatus of Fig. 1.

Fig. 2 is a section taken on the line II—II of Fig. 1;

Fig. 3 is a longitudinal section on an enlarged scale of the controlling device of said plant;

Fig. 3a is a cross-sectional view on enlarged scale of a detail in Fig. 3;

Fig. 4 is a diagrammatic view of another embodiment of the invention, in which a turbine is driven by the exhaust gases from the internal combustion engine;

Fig. 5 is a longitudinal section on an enlarged scale of the controlling device of the plant illustrated in Fig. 4;

Fig. 6 is a longitudinal section of a controlling device showing a further embodiment; and Figs. 7 and 7a are longitudinal sections of a still further embodiment of controlling device, shown in two different positions in the two figures.

Referring to the power plant illustrated in Figs. 1 to 3, reference numeral 1 designates a reciprocating internal combustion engine operating on the two-stroke cycle principle and consisting of two cylinders 6 and 6' provided with pistons 7 and 7' respectively which are connected to the crank shaft 20 of the engine by means of connecting rods 120 and 120' respectively. 2 indicates a double-acting reciprocating air compressor driven by the internal combustion engine and connected to the crank shaft thereof by means of connecting rod 122. The air inlets of the compressor which is of a well known type are indicated at 3 and 4. The air quantity compressed at each stroke of the compressor is conducted through a pressure equalizing container 5 to a channel 124 surrounding both cylinders of the engine. Within said channel, the cylinder walls are perforated so as to provide intake ports 8 and 8' the opening and closing of which is controlled by the engine pistons 7 and 7' respectively. Each cylinder is provided with a discharge valve 9 and 9' respectively which in known manner are actuated by a cam shaft not indicated in the drawings. The combustion gases discharge through valve 9 are conducted to a pipe 10 which communicates with a pipe 10' connected to the discharge valve 9' of the cylinder 6'. Fuel is supplied to the cylinders through fuel conduits 126 and 126' respectively. The pipe 10' is further connected to a valve device generally indicated at 123 the function of which will be described later on. The prime movers driven by the exhaust gases from the internal combustion engine consisting of a reciprocating engine 12 and a turbine 14 connected to the valve device 123 by means of a conduit 128. The supply of motive fluids to these prime movers is controlled by manually operated valves 11 and 13. The reciprocating engine 12 exhausts through conduits 15 and 16, and the turbine 14 through conduit 17. Connected to the shaft of the turbine 14 is a reversing gear 18 of any well known type for reversing the direction of rotation of the driven shaft 130.

In the position of the crank shaft 20 shown in Fig. 1, the piston 7 is in its lower dead center position in which the ports 8 are uncovered, and the discharge valve 9 is open. Compressed air at a pressure somewhat exceeding the final pressure of expansion of the combustion gases in the cylinder flows through the ports 8 into the cylinder and blows the burnt products of combustion out through the valve 9, and fills the cylinder with a charge of fresh air. As the piston moves upward, the ports 8 are covered, and the flow of scavenging air will stop. The discharge valve 9 is then closed and compression begins. At the end of the compression, fuel is injected into the cylinder, where it ignites and expands, forcing the piston down on its working stroke. When the final pressure of expansion is reached, the discharge valve 9 is opened and the exhaust gases escape into the pipe 10. The ports 8 are then uncovered and scavenging air passes into the cylinder, and the cycle is repeated. The cylinder 6' works in the same manner, but its crank being placed at 180 degrees to the crank of the cylinder 6, its working stroke coincides with the compression stroke of cylinder 6 and vice versa.

The motive fluid to be supplied to the prime movers 12 and 14 should consist of exhaust gases at high back pressure and a substantial amount of excess air which is passed through the cylinders of the internal combustion engine 1 from the compressor. Thus, more air has to be compressed by the compressor up to the required scavenging pressure than is necessary solely for proper scavenging and charging of the engine cylinders. The exhaust pressure of the internal combustion engine at normal load is preferably in the range of 60 to 80 pounds per square inch, and the stroke volume of the compressor is preferably of such a size as compared with the stroke volume of the internal combustion engine that the total quantity of air compressed by the compressor and supplied to the cylinders of the engine during the scavenging period is at least 50% larger than the quantity of air which after the scavenging period remains in the cylinder as charging air.

The controlling device of the internal combustion engine comprises a governor 19 provided on a shaft 22 mechanically connected to the crank shaft 20 by means of a chain drive 21. A centrifugal governor provided with weights 27 is mounted in a housing 26 secured to the frame 25 of the internal combustion engine. The weights 27 are mounted on pivots 28 secured in supports 29 connected to the sprocket wheel 30 which is mounted on the shaft 22 and driven by means of the chain drive 21.

A pivot 31 is provided for each weight 27 between the pivots 28 and the shaft 22. The pivots 31 engage corresponding recesses or the like provided in a long sleeve 32 enclosing the free end of the shaft 22, and slidably mounted on said shaft. The free end of the sleeve 32 has provided thereon an elongation 33 extending in the longitudinal direction of the shaft. The sleeve is subjected to the action of two springs 34 and 35 surrounding the shaft, the outer spring 35 of which is stronger than the spring 34 provided in the inner part of the sleeve. The opposed ends of the two springs bear against each side of a ring 36 or the like slidably mounted on the shaft, and the opposite end of the spring 34 bears against a flange 37 formed in the inner end of the sleeve. The other end of the spring 35 bears against an intermediate ring 38 slidably mounted on the shaft and fixed at the end thereof by means of a nut 39 threaded on the shaft. The flange 37 and the intermediate ring 38 are preferably shaped in such a manner that they form guiding members for the sleeve on the end of the shaft. The outer part of the shaft end has a smaller diameter than the part of the shaft situated nearer to the frame 25 so as to form an abutting flange 40 for the ring 36 sliding on the outer part of the shaft, so that the ring 36 due to the action of the two springs normally contacts with this flange in its innermost position of adjustment. Furthermore, the sleeve 32 is provided at the inner surface with a flange 41 arranged in such a manner as to contact with the ring 36 bearing upon the flange 40 only after a certain outward movement of the sleeve from its innermost position.

Two double-armed levers 42, 43 pivotally mounted on the housing 26 cooperate with the elongation 33 of the sleeve 32. One end of the lever 42 bears against the free end 44 of the elongation 33 and the other end of said lever is connected to an arm 46 or the like in the form of a sector, Fig. 1, by means of a link 45, said sector-shaped arm being adapted to control a not illustrated fuel supply device of the internal combustion engine. One end of the other lever 43 cooperating with the elongation 33 is guided by an annular flange 47 formed on the elongation 33, while the other end of said lever by means of a link 48 operates a valve member such as a relief cock or tap 49 illustrated in section in Fig. 3a provided in a conduit 50. This conduit 50 is connected to the valve device 123 provided in the conduits connecting the internal combustion engine and the motors 12 and 14. In the embodiment of the invention above described said valve device comprises an outlet valve 23 arranged to close an opening in a housing 51 communicating with a pressure gas container 52. The outlet 53 of the conduit 10' to the valve device is connected to the housing 51, and the outlet 54 communicating through pipe 128 with the motors 12 and 14 is connected to the container. A check valve 55 is provided in the passage between the housing 51 and the pressure gas container 52 and serves to prevent back flow of the driving medium from the container to the internal combustion engine, if the pressure in the conduits 10 and 10' should fall below the pressure prevailing in the container and the rest of the conduit. A piston 57 is connected to the outlet valve 23, which is guided in a housing 56 secured below the housing 51 and connected to the outlet pipe 24, said piston 57 being adapted to move in a cylinder 58 formed in the housing 56. The cylinder 58 communicates with the equalizing container 5 by means of a conduit 59, in which preferably at the point of connection to the cylinder 58 is provided a choke valve 60 preferably having an adjustable cross-sectional area. Instead of being connected to the container 5, the cylinder 58 may be connected to any other room containing motive fluid for the prime movers or compressed air, such as to pipe 10'. The above-mentioned conduit 50 provided with the tap 49 also communicates with the cylinder 58, so that a means is provided for adjusting the pressure in the cylinder 58 and consequently the piston pressure to the desired value by suitable adjustment of the tap 49 relatively to the cross-sectional area of the choke valve 60. The pressure acting upon the bottom of the piston 57 as well as the pressure of a spring 61 tend to move the outlet valve 23 towards closing position, and the pressure in this direction may be varied through adjustment of the spring tension by means of a hand wheel 62. For this purpose the spindle 63 of said hand wheel is arranged to move the lower end of the spring in the direction to and from the valve upon rotation of the hand wheel 62.

The controlling device for the outlet valve operates in the following manner:

Assuming that the internal combustion engine is running at normal speed of revolution with normal consumption of driving medium in the fully loaded motors 12 and 14, the combustion gases discharged from the engine will be forced through the conduits 10 and 10' into the container 52. The outlet valve 23 will then stay closed due to the pressure in the cylinder 58 and the pressure of the spring 61 counteracting the pressure of the driving medium on the head of the valve, and consequently all the driving medium produced by the internal combustion engine will be conducted through the outlet 54 of the container to the motors. The governor weights 27 assume a certain position, and the sleeve 32 is moved outwards into the normal position, in which the flange 41 contacts with the ring 36, which is kept against the abutting flange 40 on the shaft 22 by the strong spring 35. In this position of the sleeve 32 the sector-shaped arm 46 connected to the lever 42 is in such position that a normal amount of fuel is supplied to the internal combustion engine through the fuel valves. In said position of the sleeve the lever 43 also keeps the tap 49 closed.

If, however, the speed of the internal combustion engine at a change of the working conditions should exceed a certain value, for instance due to an increased consumption of driving medium in the motors 12 and 14 resulting in a reduced pressure of the driving medium in pipes 10, 10' and 128 and a lower back pressure in the internal combustion engine, the sleeve 32 is moved further outwards. The ring 36 bearing on the flange 41 is then, as indicated in Fig. 3, moved outwards from the flange 40 on the shaft 22 against the action of the strong spring 35, and the lever 42 affects the fuel supply device in such a manner that the quantity of fuel supplied to the internal combustion engine is reduced. The speed of revolution of the internal combustion engine is thus prevented from exceeding the maximum allowable value. During this movement of the sleeve 32 the tap 49 is kept closed by the lever 43, and the outlet valve 23 is also closed.

On the other hand, when the speed of revolution of the internal combustion engine is reduced due to an increased driving medium pressure in pipes 10, 10' and 128, caused by a reduction of the driving medium consumption in the motors or during the manoeuvring of the same, and a consequent increase of the back pressure in the internal combustion engine, the sleeve 32 is moved from the position mentioned above in the opposite direction on the shaft 22, that is, to the right in Fig. 3. The ring 36 is then in a certain position of the sleeve brought into contact with the abutting flange 40 on the shaft 22, so that the strong spring 35 ceases to act upon the governor weights. In this position of the sleeve— the normal position—or immediately afterwards, when the displacements of the governor weights are only counteracted by the weak spring 34, the lever 43 starts to open the tap 49, which is opened still more upon further displacement of the sleeve in the direction to the right as viewed in Fig. 3. This results in the pressure medium in the cylinder 58 starting to escape through the tap in the direction indicated by the arrows 132 and 134. The upward pressure on the piston 57 is then reduced more and more, and, when the tap has opened so much that more pressure medium escapes through the tap than that introduced through the choke valve 60, the pressure prevailing in the conduit 10' and acting upon the upper surface of the outlet valve 23 overcomes the forces acting upon the piston in the opposite direction and opens the valve 23, so that the driving medium from the conduits 10 and 10' will flow to the outlet 24 through the valve opening. The pressure in the conduits 10 and 10' is thus reduced causing an increase of the speed of the internal combustion engine due to the reduced back pressure. The increased speed makes the governor choke the tap 49 and thereby close the outlet valve 23 due to the increased pressure in the cylinder 58. Owing to this control of the outlet valve the speed of the internal combustion engine will vary between two low values, or the outlet valve will be adjusted in such a manner that the driving medium continuously escapes through the valve opening at low numbers of revolutions. Stopping of the internal combustion engine is thus prevented, even if the motors 12 and 14 are temporarily stopped by means of the valves 11 and 13, for instance, when the reversing device 18 is actuated. During the time when the outlet valve 23 is opening, the check valve 55 remains closed due to the superpressure prevailing in the container 52. It is thereby made possible to drive the motors momentarily at the start by means of driving medium from the container having higher pressure than the back pressure of the internal combustion engine. The opening pressure of the outlet valve 23 may be adjusted by means of the hand wheel 62, while the normal pressure of the driving medium is exclusively determined through the control of the amount of fuel supplied to the internal combustion engine.

In the arrangement above described the internal combustion engine producing the driving medium is controlled fully automatically according to the operating conditions of the prime movers, and the speeding of the internal combustion engine upon reduction of the pressure of the driving medium under normal pressure is also effectively prevented. An interruption of the operation of the internal combustion engine is thus prevented. Obviously, while the outlet valve 23 is kept open, the internal combustion engine in the plant above described is supplied with the same quantity of fuel per revolution as that necessary for normal working of the engine. This brings about an unnecessary high fuel consumption, especially due to the reduced back pressure of the driving medium, even if the reduced fuel consumption per time unit resulting from the reduced speed of revolution is taken into consideration. This is of little importance when the prime movers are out of operation for short periods of time. However, when the prime movers are driven continuously with small consumption of driving medium it is of great importance that the fuel supply may be adjusted to the desired quantity independently of the above described automatic controlling device. This is achieved in a very simple manner by providing the pivotally mounted sector-shaped lever 46 connected to the governor with a hand lever 64 or the like preferably adjustable along a scale and co-operating with the fuel pump in such a manner that the quantity of fuel delivered by the fuel pump is changed by moving the hand lever. Advantageously, the edge of the sector lever 46 is serrated as indicated in Fig. 1a, the hand lever 64 being adjustably connected thereto through the usual latch, the movement of lever 64, either as a result of movement of the lever 46 or as a result of manual adjustment of lever 64 with respect to lever 46, operating to change the quantity of fuel delivered by the fuel pump. The fuel pump may be of any suitable conventional form and adjustment through movement of lever 64 may be effected by means of suitable connecting linkage indicated at 45a. Furthermore, this device makes it possible to adjust the pressure of the driving medium within wide limits according to existing working conditions, and consequently to adjust the output of the motors. This fact is of very great importance when the invention is carried into practice, especially when it is applied to railroad locomotives, ice-breaking vessels, or any plant, in which the output is subjected to great variations.

While in the above described power plant the pressure in the conduits connecting the internal combustion engine with the prime movers is increased at low loads on the latter due to the reduction of flow of motive fluid to the prime movers by means of the controlling valves 11 and 13, other conditions exist in plants in which the prime movers consist of turbines with normally uncontrolled constant cross-sectional area of the inlet valve and turbine nozzles and where the prime movers are controlled indirectly by varying the fuel supply to the internal combustion engine in accordance with the load on the prime movers. In this instance, the fuel supply to the engine is increased at high loads on the turbine, and the engine thus works at high speeds and with increased exhaust or back pressure, while at low loads on the turbine the speed of the engine and the exhaust or back pressure are decreased on account of the reduction in fuel supply. Thus, low exhaust pressures correspond to low speeds of the engine and high exhaust pressures to high speeds. This offers the possibility to control the outlet valve arranged in the connection between the internal combustion engine and the turbine in response to variations of the pressure of the exhaust gases from the engine in such a manner that the outlet valve is opened when the pressure falls to a certain value, and the outlet valve is closed when the pressure is above this value. Instead of the pressure of the exhaust gases the pressure of the compressed scavenging air may be used to control the outlet valve, since this pressure varies with the exhaust pressure on account of the communication between the discharge side of the compressor and the exhaust pipe of the engine during the scavenging period. Also any other pressure varying in response to the speed of the internal combustion engine such as the pressure of the lubrication oil or the cooling water may be used to control the outlet valve.

A power plant of this type is more or less diagrammatically illustrated in Figs. 4 and 5. The internal combustion engine designated by the reference numeral 1 is similar in construction to that shown in Fig. 1 and drives a rotary air compressor 136 connected to the crank shaft of the engine by means of a speed increasing gear the gear wheels 138 and 140 of which are mounted on the crank shaft and compressor shaft respectively. The air drawn in through the compressor inlet 141 is compressed to a pressure somewhat higher than the exhaust pressure of the engine and is then passed through the pressure conduit 142 and the scavenging ports 8 or 8' into the cylinder 6 or 6'. The partly expanded combustion gases are conducted to the conduits 10 and 10' through the exhaust valves 9 and 9' provided in the cylinder head together with the excess air supplied to the internal combustion engine from the compressor. The mixture of exhaust gases and excess air is conducted through pipe 144 to a turbine 146 provided with a stop valve 148. After complete expansion in the turbine the gas mixture is conducted to the outlet 150 of the turbine. In the drawing the turbine is illustrated as being used for driving a screw 152 such as the propelling screw of a vessel. This screw is connected to the turbine by means of a reduction gear 154. The operating device 156 for the stop valve 148 of the turbine is connected to a disc 158 provided on the valve spindle by means of a wire 160 or the like guided over rollers 162.

A governor 164 is coupled to the main shaft 20 of the internal combustion engine, which governor, however, is only adapted to limit the maximum speed of revolution of the internal combustion engine by influencing the fuel pump 71 in such a manner that the amount of fuel supplied to the fuel valves 72 and 72' through the fuel pipes 126 and 126' is reduced, when the normal speed of revolution of the internal combustion engine is exceeded, and increased, when said speed of revolution is reduced below normal. The fuel supply during normal range of load is controlled manually by means of a hand lever 74 adjustable along a circular scale 73.

Inserted into the pipes connecting the internal combustion engine with the turbine is an outlet valve generally indicated at 76. The control of this valve is effected by means of a servomotor 75 provided with an auxiliary controlling device 66. The outlet valve member 166 is movable in a housing 67 connected to the conduit 10' and to the outlet conduit 24 in which a choking means such as a choke valve 171 may be inserted, as indicated in Fig. 4 only. In the upper position the valve 166 closes the opening to the outlet 24 giving the pressure medium free admission to the conduit 144 and in its lower position the valve closes the opening to the conduit 144 leading to the turbine, allowing the motive fluid to flow to the outlet 24. The spindle 77 of the valve 166 extending through the housing 76 is provided at its lower end with a double-acting piston 79 secured thereto and movable in a cylinder 78. The closed cylinder chambers provided above and below said piston are connected to pipes 80 and 81, respectively, communicating with the controlling device 66 of said piston. This device comprises a sleeve 84 provided at one end with a piston 83 and slidable in a housing 82, which sleeve is adapted to be displaced by the pressure of the air compressed in the compressor, said pressure continually acting upon one side of the piston 83 and counteracting the pressure of a spring 85 the tension of which may be adjusted by means of a screw 86 or the like. A duct 87 is provided in the housing 82 and connected to the pressure conduit 142 of the compressor by means of a pipe 88. Said duct opens below the piston 83 into a cylindrical bore 89 provided in the lower portion of the housing 82. The duct 87 is in permanent communication with two grooves 92 and 93 provided in the sleeve through ducts 90 and 91 respectively. The groove 92 may be connected to the chamber below the piston 79 in one position of displacement of the sleeve through the pipe 80 and the opening 94 in the housing 82, so that the valve 166 may be caused to close the opening to the outlet 24 and to open the passage from the conduit 10' to the turbine, while in the other position of displacement of the sleeve 84, illustrated in the drawings, the groove 93 is connected to the chamber at the upper side of the piston 79 through pipe 81 and an opening 95, so that the valve 166 is displaced downwards so that the passage to the turbine through the conduit 144 is shut off and the opening to the outlet 24 is opened. Simultaneously with the connection of the chamber below the piston 79 to the pressure medium in one position of displacement of the sleeve the cylinder chamber at the upper side of the piston 79 is connected to the atmosphere through the pipe 81, the opening 95, and a third groove 96 in the sleeve 84, which for this purpose communicates through openings 97 or the like with an axial bore 98 provided in the sleeve. On the other hand, when the upper side of the piston 79, in the position of displacement of the sleeve illustrated in Figure 5, is connected to the compressed air, the cylinder chamber below the piston 79 is brought into communication with the atmosphere through the pipe 80, the opening 94, the groove 96, the openings 97 and bore 98. Also the chamber above the piston 83 secured to the lower end of the sleeve 84 may be connected to the axial bore through an opening 99 or the like in order to bring said chamber into communication with the atmosphere.

The operation of the plant is as follows:—

During normal working of the turbine a suitable quantity of fuel determined by the position of the operating lever 74 is supplied to the cylinders of the internal combustion engine, and driving medium of normal pressure above atmospheric is supplied to the turbine through the exhaust valves 9 and 9' and the conduit 10, 10' and 144. The spring 85 acting upon the sleeve valve 84 is then adjusted in such a manner that the pressure of the compressed air against the piston 83 of the sleeve valve moves said sleeve valve into its upper limiting position. The piston 79 is then maintained in its upper position through the action of the compressed air acting upon the lower surface of said piston, which air is conducted to the bottom end of the cylinder 78 from the pipe 88 through the ducts 87 and 90, the groove 92 and the pipe 80. The valve 166 keeping the opening to the outlet 24 of the housing 67 closed, and the passage to the turbine through the conduit 144 open, the turbine will operate at normal output. When it is desired to operate the turbine at an increased output, the pressure of the driving medium is increased through supply of a larger quantity of fuel to the fuel valves 72 and 72' of the internal combustion engine by means of suitable adjustment of the operating lever 74 co-operating with the fuel pump 71. This results in an increase of the speed of revolution of the internal combustion engine during the period of time necessary for raising the back pressure in the cylinders of the internal combustion engine and the corresponding pressure in the conduits 10, 10' and 144, and, if the maximum speed of revolution of the internal combustion engine should thereby be exceeded, the governor 164 automatically reduces the fuel supply, until the pressure of the driving medium and the speed of revolution of the internal combustion engine have reached the values corresponding to the position of the operating lever 74. The outlet 24 remains closed by the outlet valve 166 during these operations.

On the other hand, when it is desired that the turbine shall give a lower output, the quantity of fuel supplied to the internal combustion engine is accordingly reduced by the operating lever 74, and the pressure of the driving medium and the speed of revolution of the internal combustion engine is correspondingly reduced. However, the communication between the internal combustion engine and the turbine is then maintained, if the operating lever is not adjusted for such low fuel supply that the corresponding air pressure on the piston 83 of the sleeve valve 84 is reduced to such an amount that the sleeve valve is moved into its lower end position by the spring 85. When this occurs, the supply of driving medium to the turbine is disconnected and the driving medium flows out through the outlet conduit 24. This occurs due to the sleeve valve 84 opening a communication between the chamber above the piston 79 and the compressed air through the groove 93, so that the outlet valve 166 is moved into the position illustrated in Figure 5, in which the passage to the turbine is closed, and the passage to the outlet is opened. The valve 166 may be brought into action at a driving medium pressure corresponding to a certain desirable value of the speed of the internal combustion engine through suitable adjustment of the spring counteracting the pressure of the piston 83 by means of the screw 86, preferably so that the speed of revolution by a small amount exceeds the minimum speed of revolution at which the internal combustion engine can be kept running. Hereby the turbine is stopped, so that the propelling screw 152 or the like driven by the turbine may be reversed. To start the turbine again it is only necessary to supply a larger quantity of fuel to the idling internal combustion engine by means of the operating lever 74. The pressure of the driving medium and the compressed air is hereby increased, which is a result from the increasing pressure drop in the outlet conduit and the valves built up due to the increase in escaping gas quantities and flow resistance in the valve openings and/or conduit, and consequently the sleeve valve and the outlet valve 166 are moved upwards and the communication between the internal combustion engine and the turbine is opened again. Said restriction to the flow of driving medium may also be increased by special choking means such as the choke valve 171, indicated in Fig. 4.

The turbine may also be stopped by closing the stop valve 148 by means of the lever 156, in which case a safety valve 168 provided in the conduit 144 opens at a certain pressure of the driving medium. The cross-sectional area of the opening of the stop valve 148 may also be varied by means of the lever 156, it being thus possible to run the turbine at a lower pressure than the pressure prevailing in the conduit 144, and consequently to adjust the turbine for different outputs, for instance within the low load range of the turbine.

In the modified forms of the controlling device illustrated in Figures 6, 7, and 7a, the outlet valve is formed as a butterfly valve pivotally mounted in the housing by means of a transverse spindle 100, in order that the valve in one position may shut off the passage to the outlet conduit and in another position leave this passage open.

According to Figure 6, the butterfly valve 170 is connected to the end of a rod 102 by means of a lever 172, a connecting link 101 pivotally connected to said lever and to the rod 102. The lower end of the rod 102 is connected to the piston 79 which is movable in the cylinder 78. A pipe 103 connects the pressure conduit of the compressor to the lower part of the cylinder 78 so that the air pressure acts upon the face of the piston 79 against the action of a spring 104. If the air pressure is higher than the spring pressure, the piston will be moved into the position illustrated in Figure 6. In this position the valve 170 keeps the communication to the outlet conduit 24 closed and the passage 144 to the turbine open. However, when the pressure of the compressed air is lower than the spring pressure, the piston is moved downwardly and the valve 170 is turned into such a position that the passage to the turbine is closed and the communication to the outlet 24 opened. In order to give free admission of atmospheric air to the upper side of the piston 79 during the movement of the piston, openings 105 are provided in the wall of the cylinder 78.

In the embodiment illustrated in Figs. 7 and 7a the butterfly valve 170', which normally shuts off the outlet conduit 24', is pivotally mounted on a spindle 100' and connected by means of a link 106 to the stem 107 of a valve 108 controlling the passage 144' to the turbine. This valve is guided in the valve housing 76' and is influenced, in a similar manner to that described in connection with the previous embodiments, by the pressure of the driving medium or the compressed air through the medium of a piston secured to the spindle 107. The valve 170' will then close the outlet 24' as the valve 108 opens the passage to the turbine, and conversely so that the valve 170' takes the positions illustrated in Figs. 7 and 7a, respectively.

While the construction and arrangement of the plants herein described are of a generally preferred form, obviously modifications may be made without departing from the spirit of the invention or the scope of the claims.

What I claim is:—

1. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, means responsive to the speed of said engine for controlling the supply of fuel thereto, and means responsive to the minimum speed of said engine for opening said outlet valve.

2. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, means responsive to the maximum speed of said engine for decreasing the supply of fuel thereto, and means responsive to the minimum speed of said engine for opening said outlet valve.

3. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, means responsive to the maximum speed of said engine for decreasing the supply of fuel thereto, means providing a fluid under pressure for maintaining said outlet valve in closed position, and means responsive to the minimum speed of said engine for reducing the pressure of said fluid under pressure, whereby to open said outlet valve.

4. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, means responsive to the maximum speed of said engine for decreasing the supply of fuel thereto, a pressure cylinder containing fluid under pressure and provided with a piston connected to said outlet valve, a pressure relief valve connected to said pressure cylinder, a speed governor driven by said engine, and means responsive to the deviations of said speed governor connected to said pressure relief valve and arranged to open the same at the minimum speed of said engine, whereby to decrease the pressure in said pressure cylinder and to open said outlet valve.

5. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, means responsive to the maximum speed of said engine for decreasing the supply of fuel thereto, a pressure cylinder containing fluid under pressure and provided with a piston connected to said outlet valve, a manually adjustable spring for pressing said outlet valve against its closing position, a pressure relief valve connected to said pressure cylinder, a speed governor driven by said engine, and means responsive to the deviations of said speed governor connected to said pressure relief valve and arranged to open the same at the minimum speed of said engine, whereby to decrease the pressure in said pressure cylinder and to open said outlet valve.

6. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, means responsive to the maximum speed of said engine for decreasing the supply of fuel thereto, a pressure cylinder connected to the discharge conduit of said air compressing means and provided with a piston connected to said outlet valve, a pressure relief valve connected to said pressure cylinder, a speed governor driven by said engine, and means responsive to the deviations of said speed governor connected to said pressure relief valve and arranged to open the same at the minimum speed of said engine, whereby to decrease the pressure in said pressure cylinder and to open said outlet valve.

7. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, a speed governor driven by said engine, and means responsive to the deviations of said speed governor and arranged to decrease the supply of fuel to said engine at the maximum speed thereof and to cause said outlet valve to open at the minimum speed of said engine.

8. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, a speed governor driven by said engine, and means responsive to the deviations of said speed governor and arranged to decrease the supply of fuel to said engine at the maximum speed thereof and to cause said outlet valve to open at the minimum speed of said engine, a sleeve in said speed governor, a weak spring in said speed governor cooperating with said sleeve and arranged to counteract the deviations of the sleeve at least at low speeds of said engine, and a strong spring in said speed governor cooperating with said sleeve and arranged to counteract the deviations of the sleeve at high speeds of said engine.

9. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, a speed governor driven by said engine, and means responsive to the deviations of said speed governor and arranged to decrease the supply of fuel to said engine at the maximum speed thereof and to cause said outlet valve to open at the minimum speed of said engine, a displaceable sleeve in said speed governor, a ring member movable in the direction of displacement of said sleeve, a flange, a strong spring resting with one end on one side of said movable ring member and acting to push the ring member towards said flange, a weak spring interposed between the opposite side of said movable ring member and said sleeve, and an abutting flange for said ring member provided on said sleeve and arranged to transmit the displacement force of the sleeve to the stronger spring within the range of high speeds of said engine, the sleeve displacements at low speeds being taken up by the weaker spring.

10. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the amount of motive fluid supplied to said prime mover, a speed governor driven by said engine, and means responsive to the deviations of said speed governor and arranged to decrease the supply of fuel to said engine at the maximum speed thereof and to cause said outlet valve to open at the minimum speed of said engine, a shaft in said governor driven by said engine, a displaceable sleeve enclosing said shaft, a ring member movable in the direction of displacement of said sleeve, an abutment on said shaft forming a stop for said ring member on one side, a strong spring resting with one end on opposite side of said movable ring member and acting to push the ring member towards said abutment, a weak spring interposed between said sleeve and said movable ring member on the same side as said abutment, and an abutting flange for said ring member provided on said sleeve and arranged to transmit the displacement force of the sleeve to the stronger spring within the range of high speeds of said engine, the sleeve displacements at low speeds being taken up by the weaker spring.

11. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, and means responsive to a low pressure of a fluid, the pressure of which is indicative of the operating conditions of said engine, for opening said outlet valve upon decrease in the pressure of said last-mentioned fluid.

12. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means responsive to the pressure of the air compressed in said compressing means for opening said outlet valve upon decrease in the pressure of said air, and means for controlling the output of said prime mover by varying the supply of fuel to said engine.

13. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means responsive to a low pressure of a fluid, the pressure of which is indicative of the operating conditions of said engine, for opening said outlet valve upon decrease in the pressure of said last-mentioned fluid, means for controlling the output of said prime mover by manually varying the supply of fuel to said engine, and means responsive to the speed of said engine for decreasing the supply of fuel to said engine at the maximum speed thereof.

14. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, a pressure cylinder connected to a fluid under pressure indicative of the operating conditions of said engine, a piston movable in said pressure cylinder and adapted to close said outlet valve at high pressures of said last-mentioned fluid and to open said outlet valve at low pressures of said last-mentioned fluid, means for controlling the output of said prime mover by manually varying the supply of fuel to said engine, and means responsive to the speed of said engine for decreasing the supply of fuel to said engine at the maximum speed thereof.

15. In a power plant, a turbine for expanding motive fluid to produce power and providing for unregulated flow of motive fluid therethrough, a reciprocating internal combustion engine having a cylinder in which charge forming air is compressed and discharging combustion gases at substantial back pressure for further expansion in said turbine, an air compressor driven by said engine for supplying charging and scavenging air to said cylinder at a pressure sufficiently high to cause a part of such air to be discharged at said back pressure with said combustion gases, a conduit for leading motive fluid from said engine to said turbine, and means responsive to a fluid pressure indicative of the operating conditions of said engine for connecting the discharge side of said engine with said turbine upon increase in pressure of said last-mentioned fluid and for connecting the discharge side of said engine with the atmosphere upon decrease in pressure of said last-mentioned fluid.

16. In a power plant, a prime mover for expanding motive fluid to produce power, a reciprocating internal combustion engine having a cylinder in which charge forming air is compressed and discharging combustion gases at substantial back pressure for further expansion in said prime mover, air compressing means driven by said engine for supplying charging and scavenging air to said cylinder at a pressure sufficiently high to cause a part of such air to be discharged at said back pressure with said combustion gases, a conduit for leading motive fluid from said engine to said prime mover, an outlet valve arranged in said conduit and adapted to vent motive fluid from said conduit to a zone of lower pressure, means for controlling the output of said prime mover, means responsive to the speed of said engine for decreasing the supply of fuel to said engine at the maximum speed thereof, and means responsive to a low pressure of a fluid, the pressure of which is indicative of the operating conditions of said engine, for opening said outlet valve upon decrease in the pressure of said last-mentioned fluid.

JOHAN ERIK JOHANSSON.